(12) United States Patent
Davis

(10) Patent No.: US 6,773,324 B1
(45) Date of Patent: Aug. 10, 2004

(54) BILBOQUET TOY AND METHOD OF USE THEREOF

(76) Inventor: Richard W. Davis, 2107 E. Aspen Dr., Tempe, AZ (US) 85282

( * ) Notice: Subject to any disclaimer, the term of this patent is extended or adjusted under 35 U.S.C. 154(b) by 0 days.

(21) Appl. No.: 10/366,151

(22) Filed: Feb. 12, 2003

(51) Int. Cl.[7] ............................................. A63H 33/38
(52) U.S. Cl. ........................ 446/147; 446/71; 473/508
(58) Field of Search ................................ 473/506, 508; 446/71–73, 76, 81, 141–143, 397, 404; 273/332, 336, 126 R; D14/250; 224/929–930

(56) References Cited

U.S. PATENT DOCUMENTS

| | | | |
|---|---|---|---|
| 1,556,794 A | * 10/1925 | Manson | 473/506 |
| 2,166,115 A | * 7/1939 | Bergenn | 473/508 |
| D136,869 S | * 12/1943 | Garcia | D21/465 |
| D224,332 S | * 7/1972 | Hernandez | D21/465 |
| D253,430 S | 11/1979 | Morrison | |
| D257,633 S | * 12/1980 | Garcia | D21/465 |
| D321,017 S | * 10/1991 | Aguilar | D21/465 |
| D344,106 S | * 2/1994 | Casha | D21/465 |
| 2003/0157973 A1 | * 8/2003 | Yang | 455/569 |
| 2003/0172567 A1 | * 9/2003 | Zentner et al. | 40/591 |

FOREIGN PATENT DOCUMENTS

| | | | |
|---|---|---|---|
| JP | 10314356 A | * 12/1998 | A63B/67/08 |
| JP | 11206939 A | * 8/1999 | A63B/67/08 |
| JP | 11313907 A | * 11/1999 | A63B/67/08 |
| JP | 2000014848 A | * 1/2000 | A63B/67/08 |

OTHER PUBLICATIONS

Bilboquet: Cup and Ball or Ring and Pin Games, Internet: http://www.ahs.uwaterloo.ca/~museum/bilboquet/pages/index.html, 2001.*
Bilboquet: Cup and Ball or Ring and Pin Games http://www.ahs.uwaterloo.ca/~museum/bilboquet/pages/.
Balero Players' Association International http://www.the-unit.com/balerohistory.htm.

* cited by examiner

Primary Examiner—Derris H. Banks
Assistant Examiner—Urszula M Cegielnik
(74) Attorney, Agent, or Firm—Lowell W. Gresham; Jordan M. Meschkow; Meschkow & Gresham, P.L.C.

(57) ABSTRACT

A bilboquet toy (20) is provided. The toy (20) incorporates a handheld radio (26), such as a cellular telephone or other handheld electronic device, to which is attached a coupler (22). A bille (24), in the form of a stylized ring or cup, is coupled to the coupler (22) by a tether (32). In play, the bille (24) is tossed upward and caught as it falls upon an antenna (28) of the radio (26). The bille (24) may assume any of a plurality of shapes to allow different forms and levels of play. The coupler (22) may be removable, such as an O-ring pressed over the antenna (28), semi-removable, as a two-part hook-and-loop fastener, or permanent. Either the coupler (22) or the bille (24) may display advertising copy (46). The coupler (22), the bille (24), and the tether (32) are fabricated of non-conducting materials to avoid interference with communicative use of the handheld radio (26).

20 Claims, 2 Drawing Sheets

BILBOQUET TOY AND METHOD OF USE THEREOF

TECHNICAL FIELD OF THE INVENTION

The present invention relates to the field of toys. More specifically, the present invention relates to the field of bilboquet toys.

BACKGROUND OF THE INVENTION

The course of daily life is often occasioned with idle time in which a person must wait for an event to occur. Waiting time in a doctor's office is an example of such idle time. It is beneficial to have some divertissement when such idle time occurs. One such divertissement may be the game of bilboquet.

Bilboquet, also called balero, is an ancient amusement found in most cultures throughout the world. Bilboquet is played with a bilboquet toy that may take any of several forms, the most common of which are ring-and-pin and ball-and-cup bilboquet toys.

A traditional bilboquet toy has a pin or cup with a handle. This is the "boquet." An often-stylized ring or ball, the "bille," is tethered to the boquet. The object of play is to toss the bille into the air and catch it on/in the boquet.

Bilboquet toys have evolved and become stylized over the centuries. The bille may be shaped as a hollow cylinder, a ball with a hole therein, a "hat," or any of multitudinous other shapes influenced by the ethnicity and creativity of the designer. Many are composite toys, having multiple cups, pins, and/or holes requiring differing levels of skill.

The game of bilboquet, while simple, requires a certain dexterity for mastery. Skill at bilboquet requires good hand-eye coordination and fast reflexes. Achieving this skill through practice is a generally pleasant activity, entirely suited to the whiling-away of idle time.

Unfortunately, a bilboquet toy must be present when and where a person encounters idle time. This would not be the case with a traditional bilboquet toy, as it would be but one more thing to carry in the hurried activities of the modern electronic age. There is, therefore, a need for an improved bilboquet toy that is inexpensive and unobtrusive, allowing it to be completely ignored until desired.

In addition, a problem exists in general marketing in that there is a continuing need to provide effective advertisement at low cost. To be effective, an advertisement should capture and retain the attention of potential clients. Too many advertising options are either too expensive, too complex, or faced with a preponderance of competing advertisements to be effective in fulfilling these goals. This marketing problem is especially significant when there is a greater than normal need for the advertisement because of unusual competition or need to attract attention, e.g., at trade shows, conventions, grand openings, and sales.

There is, therefore, a need for an appropriate device to address this problem. A suitable bilboquet toy may be emblazoned with a logo or other advertising copy, thereby making of the toy the desired marketing tool suitable for distribution at trade shows, conventions, grand openings, sales, etc.

SUMMARY OF THE INVENTION

Accordingly, it is an advantage of the present invention that a bilboquet toy and a method of play therewith are provided.

It is another advantage of the present invention that a bilboquet toy is provided that incorporates a handheld electronic device as the boquet.

It is another advantage of the present invention that a bilboquet toy is provided that is inexpensive to manufacture and that displays advertising copy.

The above and other advantages of the present invention are carried out in one form by a bilboquet toy made up of a handheld electronic device having a protrusion, a coupler configured to attach to the handheld electronic device, a bille configured to be caught by the protrusion, and a tether tethering the bille to the coupler.

The above and other advantages of the present invention are carried out in another form by a method of using a bilboquet toy consisting of a handheld electronic device with a protrusion, attaching a coupler to the handheld electronic device, coupling a bille to the coupler via a tether, said bille having a cavity or hole configured to pass over the protrusion, tossing the bille upward, and attempting to catch the bille upon the protrusion of said handheld electronic device.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
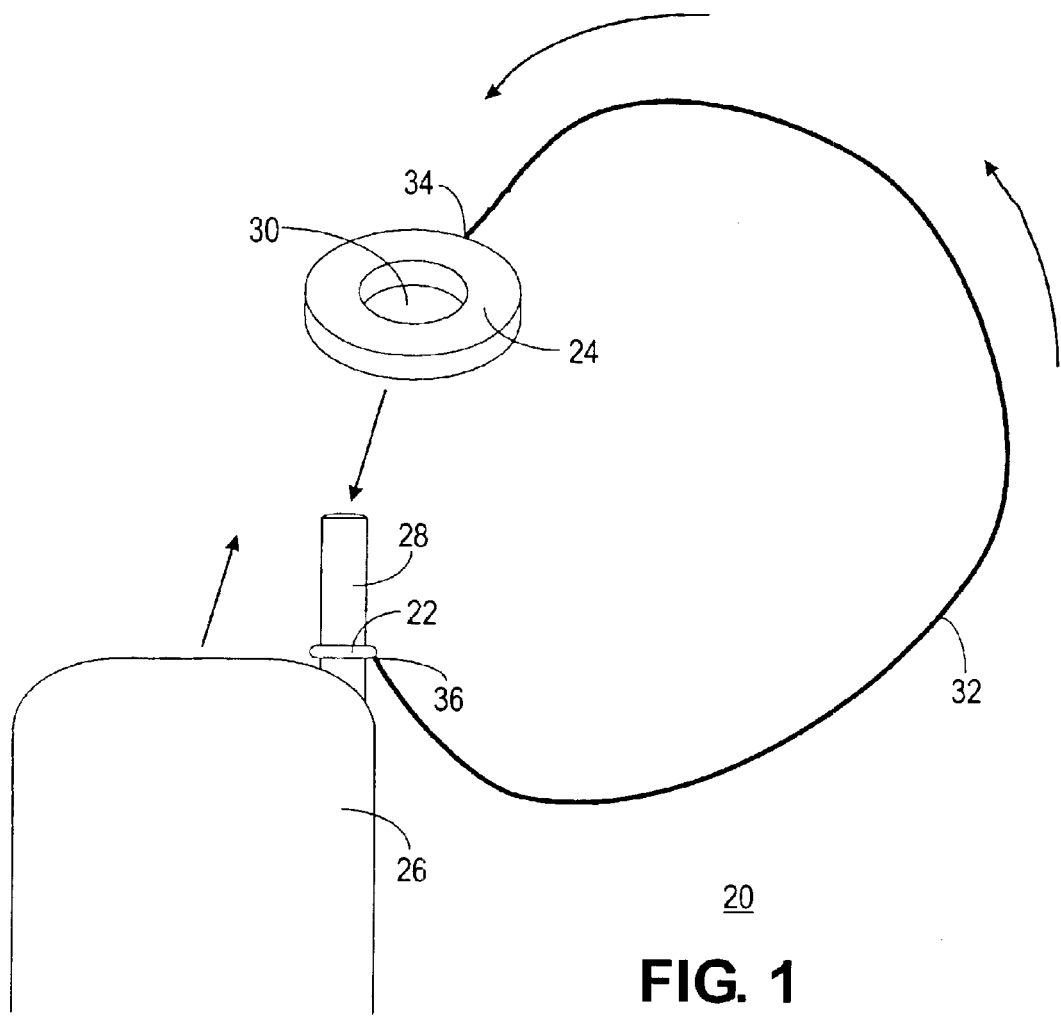
FIG. 1 shows a front view depicting a bilboquet toy in use with an O-ring coupler and an annular bille in accordance with a preferred embodiment of the present invention.

FIG. 1 shows a front view depicting a bilboquet toy 20 with an O-ring coupler 22 and an annular bille 24 in accordance with a preferred embodiment of the present invention.

In the present invention, a bilboquet toy 20 is presented that desirably uses a cellular telephone having a protruding antenna as the boquet and its pin. The cellular telephone, wireless non-cellular telephone, Family Radio Service (FRC) two-way radio, Personal Digital Assistant (PDA), and other handheld electronic devices are ubiquitous. For simplicity, this discussion will use the phrase "handheld radio" to mean "cellular telephone," "wireless telephone," "FRC radio," "PDA," or any other handheld electronic device having a protruding antenna or other protrusion that may be use as the pin of a boquet. Similarly, the phrase "communicative use" means the use of the device in a normal manner other than as part of bilboquet toy 20.

In the present invention, bilboquet toy 20 has a handheld radio 26 with a protruding antenna 28 serving as boquet and pin, and a bille 24 having an opening 30 configured to pass over antenna 28. Bille 24 is tethered to handheld radio 26 by a flexible cord, chain, or other tether 32.

In play, handheld electronic device 26 is held in one hand, bille 24 is tossed upward, and an attempt is made to catch bille 24 upon antenna 28 (typically by manually manipulating handheld radio 26). These actions are repeated until bille 24 is successfully caught.

Handheld radio 26 and antenna 28 desirably serve as both the bouquet of bilboquet toy 20 and its pin, or as a handheld radio. That is, in addition to the use of handheld radio 26 as the boquet of bilboquet toy 20, handheld radio 26 also continues to be used as a handheld radio. When handheld radio 26 is a cellular telephone, the user may continue to initiate and receive (communicate via) cellular telephone calls, as well as any other functions provided by the cellular telephone and the user's subscribed cellular service. Likewise, when handheld radio 26 is an FRS radio, the user may continue to communicate with other FRS radios, and when handheld radio 26 is a PDA, the user may continue to effect the functions of a PDA. This continued usage extends to whatever form of handheld electronic device is used as handheld radio 26, and is the communicative use of handheld radio 26.

It is desirable that no part of bilboquet toy 20 interrupts or interferes with the communicative use of handheld radio 26. For this reason, it is desirable that coupler 22, tether 32, and bille 24 be fabricated out of non-conducting materials that will not interfere with radio-waves or other operating characteristics of handheld radio 26. Suitable materials are plastics (nylon, etc.) and synthetic or organic fibers (polyester, cotton, etc.). The specific materials and methods of fabrication are beyond the scope of this discussion. Those skilled in the art will appreciate that the use of any given materials and/or fabrication methods does not depart from the spirit of the present invention.

FIGS. 1, 2, 3, 4, and 5 show bille 24 configured as an annulus, a cylinder, a "hat," a spheroid, and a torus, respectively, in accordance with preferred embodiments of the present invention. The following discussion refers to FIGS. 1, 2, 3, 4, and 5.

The skill required to successfully catch bille 24 on antenna 28 is a function of several factors. These factors include the diameter of antenna 28, the diameter of opening 30 into which antenna 28 must pass, the shape of bille 24, and the mass of bille 24. Ideally, the mass of bille 24 is sufficient to overwhelm the mass of tether 32, causing tether 32 to have negligible effect upon play. Because bille 24 desirably has a significant mass (relative to tether 32), bille 24 may be a solid, rather than hollow, object (except of course for opening 30).

Bille 24 may assume any desired shape. The annulus, cylinder, hat, spheroid, and torus of FIGS. 1, 2, 3, 4, and 5, respectively, are all acceptable shapes. Again, because bille 24 desirably has a significant mass, bille 24 is desirably three-dimensional (as opposed to substantially two-dimensional), and is a solid in the geometric sense as well. Many other shapes not shown in the Figures may also be used. Those skilled in the art will appreciate that the shape of bille 24 is not limited to those shapes shown and/or discussed, and that the use of other shapes for bille 24 does not depart from the spirit of the present invention.

Figure 2:
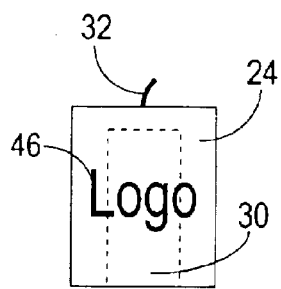
FIG. 2 shows a front view of a cylindrical bille in accordance with a preferred embodiment of the present invention.
Figure 3:
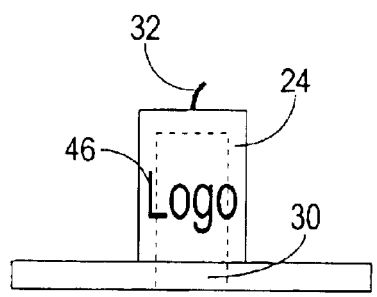
FIG. 3 shows a front view of a hat-shaped bille in accordance with a preferred embodiment of the present invention.
Figure 4:
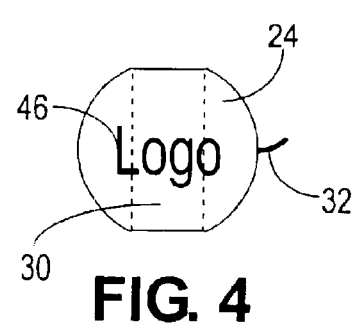
FIG. 4 shows a front view of a spherical bille in accordance with a preferred embodiment of the present invention.

In the Figures, opening 30 is depicted as either a hole through bille 24 (FIGS. 1, 4, and 5), or a cavity into bille 24 (FIGS. 2 and 3). The use of either a hole or a cavity for opening 30 is a design choice determined by the shape and desired appearance of bille 24. For example, if the cylinder depicted in FIG. 2 were to have a cavity, it would be a "cup" or "thimble" in appearance, whereas if it were to have a hole, it would be a "bead." Those skilled in the art will appreciate that the use of either a hole or a cavity does not depart from the spirit of the present invention.

Figure 5:
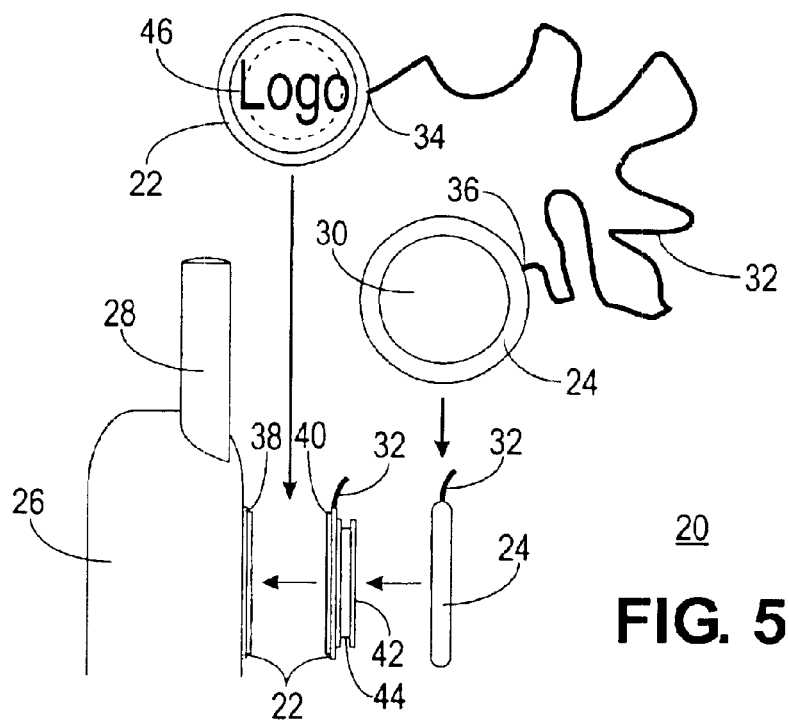
FIG. 5 shows a side view of a bilboquet toy with a two-part coupler and a toroidal bille, wherein the coupler is a hook-and-loop disk incorporating a bille-storage component in accordance with a preferred embodiment of the present invention.

FIGS. 1 and 5 demonstrate tether 32 coupling coupler 22 to bille 24 in accordance with preferred embodiments of the present invention. The following discussion refers to FIGS. 1 and 5.

To prevent the loss of bille 24 (or possible damage or injury should bille 24 be struck with too much force and be sent flying), bille 24 is tethered to handheld radio 26 by tether 32. One end 34 of tether 32 is coupled to bille 24 and the other end 36 is coupled to handheld radio 26 (through coupler 22, discussed hereinafter). The method of coupling or attaching tether 32 to bille 24 is a design choice dependent upon the form of bille 24, and the materials of which tether 32 and bille 24 are fabricated, and is beyond the scope of this discussion. The use of any given method of attachment does not depart from the spirit of the present invention.

Tether 32 should have no significant impact upon the course of bille 24 during play. Desirably, then, tether 32 should be very flexible and very light. For this reason, tether 32 is desirably akin to dental floss, i.e., a cord formed of many small fibers or microfibers. In this manner, tether 32 may be both thin and lightweight while retaining significant strength.

FIGS. 5, 6, 7, and 8 depict a two-part hook-and-loop disk, an O-ring, a clip, and an adhesive disk, respectfully, as couplers 22 in accordance with preferred embodiments of the present invention. The following discussion refers to FIGS. 1, 5, 6, 7, and 8.

In the preferred embodiments, bilboquet toy 20 is made up of handheld radio 26, bille 24, and tether 32. While it is possible to couple tether 32 directly to handheld radio 26, this may interfere with the communicative use of handheld radio 26. Therefore, bilboquet toy 20 uses coupler 22 to couple tether 32 and bille 24 to handheld radio 26.

As with bille 24 discussed hereinbefore, the method of attaching tether 32 to coupler 22 is a design choice dependent upon the form of coupler 22 and the materials of which tether 32 and coupler 22 are fabricated, and is beyond the scope of this discussion. The use of any given method of attachment does not depart from the spirit of the present invention.

Coupler 22 may assume any of a plurality of forms configured to couple tether 32 to handheld radio 26. Tether 32 may be coupled to handheld radio 26 by a temporary (transitory), semi-permanent, or substantially permanent attachment of coupler 22 to handheld radio 26.

Figure 6:
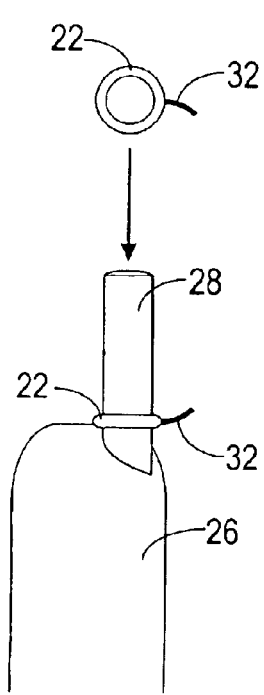
FIG. 6 shows a side view of a portion of a bilboquet toy with an O-ring coupler in accordance with a preferred embodiment of the present invention.
Figure 7:
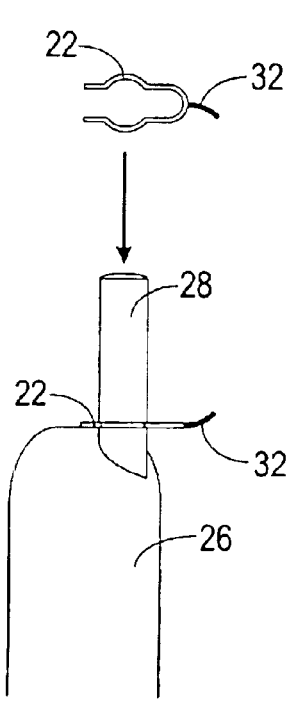
FIG. 7 shows a side view of a portion of a bilboquet toy with a clip coupler in accordance with a preferred embodiment of the present invention.

In FIGS. 1, 6, and 7, coupler 22 is configured as a ring or clip to effect a transitory attachment with handheld radio 26. As a ring (FIG. 6), coupler 22 effects attachment by being placed over antenna 28. A snug fit is shown, but this is not a requirement of the present invention. Preferably, coupler 22 is a conventional flexible O-ring of suitable diameter. Being soft and flexible, an O-ring coupler 22 may be readily attached and detached with minimal risk of damage to handheld radio 26.

As clip (FIG. 7), coupler 22 is configured to readily attach and detach to antenna 28. Those skilled in the art will appreciate that the form of clip shown for coupler 22 is exemplary only, and other forms may be used without departing from the spirit of the present invention.

While not shown in the Figures, coupler 22 may be configured to also clip and confine tether 32 when not coupled to handheld radio 26. This may allow easier transport and storage of coupler 22, bille 24 and tether 32.

Figure 8:
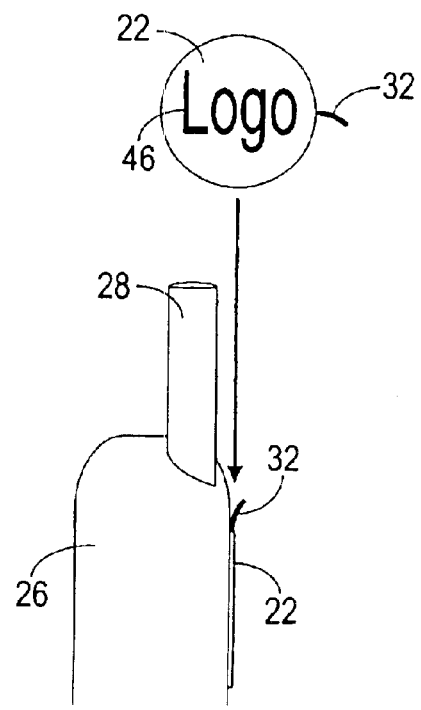
FIG. 8 shows a side view of a portion of a bilboquet toy with an adhesive disk coupler in accordance with a preferred embodiment of the present invention.

In FIG. 8, coupler 22 is configured as an adhesive disk to effect a substantially permanent attachment to handheld radio 26. As an adhesive disk, coupler 22 effects attachment by being adhered to a suitable spot on handheld radio 26, for example, a battery cover. In this manner, handheld radio 26 and bille 24 become a substantially permanent bilboquet toy 20, available for play at any time without forethought, without affecting the communicative use of handheld radio 26.

While shown as a round disk in the Figures, coupler 22 may be configured to assume any desired shape or size. This may be especially desirable if coupler 22 is to display advertising copy (discussed hereinafter). Those skilled in the art will appreciate that the use of any given shape does not depart from the spirit of the present invention.

In FIG. 5, coupler 22 is configured as a two-part adhesive disk to effect a semi-permanent attachment with handheld radio 26. In this embodiment, a first portion 38 of coupler 22 is substantially permanently attached to handheld radio 26, and a second portion 40 is connected to tether 32. When portions 38 and 40 are coupled together, the tether 32 is attached to handheld radio 26.

In the preferred embodiment of FIG. 5, first and second coupler portions 38 and 40 are substantially disks. One surface of first portion 38 is coated with an adhesive and configured to be adhered to handheld radio 26. The other surface of first portion 38 is configured as a first part of a hook-and-loop (e.g., VELCRO®) fastener. One surface of second portion 40 is configured as a second part of the hook-and-loop fastener and is configured to mate with the first part. The other surface of second portion 40 is unused for connection, but may be used to display advertising copy (discussed hereinafter). As discussed hereinbefore in conjunction with FIG. 8, coupler 22 may be configured to assume any desired shape or size.

By using a two-part fastener for coupler 22, bille 24 and tether 32 may readily be detached from handheld radio 22, thereby posing no chance of electrical or mechanical interference when handheld radio 26 is engaged in a communicative use. Desirably, portion 38 has the "loop" or pile part of the fastener, so that there will be nothing that may snag or otherwise mechanically interfere with a communicative use of handheld radio 26.

Those skilled in the art will appreciate that the Figures are exemplary only and that other forms of transient attachment of coupler 22 to handheld radio 26 may be effected without departing from the spirit of the present invention.

FIG. 5 shows coupler 22 incorporating a bille-storage button 42 in accordance with a preferred embodiment of the present invention. The following discussion refers to FIGS. 1, 5, 6, 7, and 8.

A need exists for the transportation of bilboquet toy 20 when not in use. If tether 32 and bille 24 are detachable from handheld radio 26, as in FIGS. 1, 5, 6, and 7, the tether 32 and bille 24 may be carried in a pock or pouch (purse). Handheld radio 26 may then be carried in any normal handheld-radio manner. Unfortunately, this leaves tether 32 prone to entanglement unless other precautions are taken.

When coupler 22 assumes the shape of a disk (FIGS. 5 and 8), storage button 42 (shown in FIG. 5) may be affixed to coupler 22. Storage button 42 consists of a grooved button adhered to coupler 22 and configured to friction-fit inside opening 30. A grove 44 is cut into the rim of storage button 42 to serve as a storage place for tether 32. When bilboquet toy 20 is not in use, tether 32 is wound into groove 44 and bille 24 is pressed onto storage button 42. In this manner, bilboquet toy 20 is protected from entanglement and damage and transportation convenience is increased. Storage button 42 is especially useful when bille 24 is configured as an annulus (FIG. 1) or a ring (FIG. 5).

Storage button 42 is shown in FIG. 5 in conjunction with coupler 22 configured as a two-part disk fastener. Those skilled in the art will appreciate that this is not a requirement of the present invention, and that storage button 42 may readily be used when coupler 22 is configured as an adhesive disk as in FIG. 8. Additionally, variations of storage button 42 (not shown) may be used with other configurations of coupler 22 without departing from the spirit of the present invention.

FIGS. 2, 3, 4, 5, and 8 depict advertising copy 46 in use with bilboquet toy 20 in accordance with preferred embodiments of the present invention. The following discussion refers to FIGS. 1, 2, 3, 4, 5, and 8.

In many embodiments, bilboquet toy 20 has surfaces upon which advertising copy 46 may be displayed. Such copy may be text, a logo, or other graphic. Advertising copy 46 is symbolized by the mark "Logo" in FIGS. 2, 3, 4, 5, and 8. The use of advertising copy 46 renders bilboquet toy 20 into a marketing medium. Inexpensive "bilboquet kits," made up of coupler 22, tether 32, and bille 24, may be distributed at trade shows, conventions, open houses, grand openings, and other events. These kits would be used with potential clients' existing handheld radios to create bilboquet toys 20. Thereafter, whenever the potential clients play bilboquet during idle times, advertising copy 46 will be presented to the potential clients and those around them.

Advertising copy 46 may take the form of a sticker, decal, imprint, or other mark applied by conventional means. Those skilled in the art will appreciate that the form of advertising copy 46 is beyond the scope of this discussion. The use of any given form of advertising copy 46 does not depart from the spirit of the present invention.

Desirably, coupler 22, bille 24 and/or advertising copy 46 may be realized in brightly colored or reflective materials. This would cause the bight and/or flashing movements of bille 24 and/or coupler 22 to attract the attention of passersby as a prospective client plays bilboquet. This may significantly increase the effectiveness of advertising copy 46.

Prospective clients would naturally transport bilboquet toy 20 to a plurality of other locations. Advertising copy 46 would thereby be spread over a wide area at no cost to the advertiser beyond the initial cost of the bilboquet kits.

By producing the bilboquet kits of inexpensive materials and in bulk, the per-unit cost of bilboquet toy 20 may be minimized. By dispensing the bilboquet kits for free at trade shows, conventions, grand openings, sales, etc., the advertiser may achieve a significant saturation and distribution at a minimal cost.

In summary, the present invention teaches a bilboquet toy 20 suitable for the modern electronic age and a method of play therewith. Bilboquet toy 20 incorporates a handheld electronic device as a handheld radio 26. Bilboquet toy 20 may be used as an inexpensive marketing tool to display advertising copy 46.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A bilboquet toy comprising:
   a handheld electronic device to serve as a boquet of said bilboquet toy, wherein said handheld electronic device has a protrusion, has a communicative use independent of its service as said boquet, and has said communicative use while serving as said boquet;
   a coupler configured to attach to said handheld electronic device;
   a bille having one of a cavity and a hole configured to pass over said protrusion; and
   a tether fabricated of a substantially non-conducting material and tethering said bille to said coupler.

2. A bilboquet toy as claimed in claim 1 wherein:
   said handheld electronic device is a handheld radio; and
   said protrusion is an antenna of said handheld radio.

3. A bilboquet toy as claimed in claim 2 wherein said handheld radio is a cellular telephone.

4. A bilboquet toy as claimed in claim 1 wherein each of said coupler, said bille, and said tether is fabricated of a substantially non-conducting material.

5. A bilboquet toy as claimed in claim 1 wherein said coupler is a ring configured to be placed over said protrusion.

6. A bilboquet toy as claimed in claim 5 wherein said ring is an O-ring.

7. A bilboquet toy as claimed in claim 1 wherein said coupler is a clip configured to be clipped to said handheld electronic device.

8. A bilboquet toy as claimed in claim 1 wherein said coupler is adhesive and is configured to adhere to said handheld electronic device.

9. A bilboquet toy as claimed in claim 1 wherein said coupler comprises:
   a first fastener portion adhesively coupled to said handheld electronic device; and
   a second fastener portion coupled to said tether and removably coupled to said first fastener portion.

10. A bilboquet toy as claimed comprising:
    a handheld electronic device having a protrusion;
    a coupler configured to attach to said handheld electronic device and comprising;
       a substantially flat portion adhesively coupled to said handheld electronic device;
       a storage button coupled to said substantially flat portion and configured to detachably engage said bille when said toy is not in use; and
       a groove around said storage portion configured to contain said tether when said toy is not in use;
    a bille having one of a cavity and a hole configured to pass over said protrusion; and
    a tether tethering said bille to said coupler.

11. A bilboquet toy as claimed in claim 1 wherein one of said coupler and said bille displays advertising copy.

12. A method of using a bilboquet toy, said method comprising:
    obtaining a handheld electronic device to serve as a boquet of said bilboquet toy, wherein said handheld electronic device has a protrusion, has a communicative use independent of its service as said boquet, and has said communicative use while serving as said boquet;
    attaching a coupler to said handheld electronic device;
    coupling a bille to said coupler via a tether fabricated of a substantially non-conducting material, said bille having one of a cavity and a hole configured to pass over said protrusion;
    tossing said bille upward; and
    attempting to catch said bille upon said protrusion.

13. A method as claimed in claim 12 additionally comprising repeating said tossing and attempting activities when said attempting activity fails to catch said bille.

14. A method as claimed in claim 12 additionally comprising communicating through said handheld electronic device.

15. A method as claimed in claim 12 additionally comprising displaying advertising copy upon one of said coupler and said bille.

16. A method as claimed in claim 12 wherein:
    said coupler is a ring; and
    said attaching activity comprises placing said ring over said protrusion.

17. A method as claimed in claim 12 wherein:
    said coupler is a clip; and
    said attaching activity comprises clipping said clip to said handheld electronic device.

18. A method as claimed in claim 12 wherein:
    said coupler is adhesive; and
    said attaching activity comprises adhering said coupler to said handheld electronic device.

19. A method as claimed in claim 12 wherein:
    said coupler comprises:
       a first fastener portion having an adhesive surface; and
       a second fastener portion coupled to said bille via said tether; and
    said attaching activity comprises:
       adhesively coupling said adhesive surface to said handheld electronic device; and
       removably coupling said second fastener portion to said first fastener portion.

20. A bilboquet toy comprising:
    a cellular telephone to serve as a boquet of said bilboquet toy, wherein said cellular telephone has a protruding antenna, and a communicative use independent of and coincident with its service as said boquet;
    a first fastener portion adhered to said cellular telephone;
    a second fastener portion removably coupled to said first fastener portion;
    a substantially non-conductive flexible cord having a first end coupled to said second fastener portion, and having a second end;
    a bille coupled to said second end and having one of a cavity and a hole configured to pass over said antenna; and
    advertising copy displayed upon one of said second fastener portion and said bille.

* * * * *